(12) United States Patent
Locke (10) Patent No.: US 7,589,693 B2
(45) Date of Patent: Sep. 15, 2009

(54) METHOD AND APPARATUS FOR ORIENTING A DIRECTIONAL ANTENNA

(75) Inventor: Clarence R. Locke, Seminole, FL (US)

(73) Assignee: Honeywell International Inc., Morristown, NJ (US)

( * ) Notice: Subject to any disclaimer, the term of this patent is extended or adjusted under 35 U.S.C. 154(b) by 556 days.

(21) Appl. No.: 11/331,923

(22) Filed: Jan. 13, 2006

(65) Prior Publication Data
US 2007/0164911 A1    Jul. 19, 2007

(51) Int. Cl.
*H01Q 3/02* (2006.01)
(52) U.S. Cl. .................. 343/882; 343/895; 340/572.1
(58) Field of Classification Search .............. 343/787, 343/882, 895; 340/572.1
See application file for complete search history.

(56) References Cited

U.S. PATENT DOCUMENTS 5,523,766 A * 6/1996 Erceg ..................... 343/702
5,613,224 A * 3/1997 Auvray .................. 455/575.7

* cited by examiner

*Primary Examiner*—Tan Ho
(74) *Attorney, Agent, or Firm*—Fogg & Powers LLC

(57) ABSTRACT

A device orienting apparatus includes a device-attachment structure having a non-uniform mass distribution, a post, and a base structure. The device-attachment structure includes a pivot hole and the post has a first-end section surrounded by the pivot hole. A second-end section of the post is secured so that a directional antenna is held in a preferred orientation when the post is perpendicular to a gravitational field.

21 Claims, 11 Drawing Sheets

METHOD AND APPARATUS FOR ORIENTING A DIRECTIONAL ANTENNA

BACKGROUND

Radio frequency identification (RFID) systems are employed in many applications, including tracking the movement of items in inventories. In such an application, an RFID tag or slave is attached to each item in the inventory. In one type of tracking system, an RFID reader or master queries the RFID tag on a predetermined time schedule to periodically track the inventory level. In some applications, the RFID reader reads the RFID tag of a tagged inventory item as the item passes a given location. For example, an RFID reader is located at an exit door of a store or a loading dock of a warehouse to track inventory that is leaving the store or warehouse.

The RFID tag and the RFID reader are directional antennae. The communication between the RFID reader and the RFID tag has the clearest signal with the highest signal to noise ratio when the directional antenna of the polarity of the emission from the RFID tag is aligned to the polarity of emission from the RFID reader. The efficiency of the communication between the RFID reader and the RFID tag degrades from maximum efficiency to minimum efficiency as a function of $\cos\theta$ as $\theta$ goes from $0°$ to $90°$. The angle $\theta$ is the angle between the polarity of the RFID reader and the polarity of the RFID tag.

The RFID tags can be applied in a haphazard manner to the inventory so that the RFID tag is not necessarily aligned to the RFID reader in the RFID system when the inventory is stacked for storage and/or transport to or from a given location. In this case, the communication between the RFID tag and the RFID master is degraded. In cases where the antenna of the RFID tag is perpendicular to the antenna of the RFID reader, the RFID reader may not receive transmissions from the RFID tag.

In order to prevent errors in inventory tracking, some RFID systems implement an RFID reader that changes its antenna orientation. An RFID reader that changes antenna direction has a higher complexity and higher cost than an RFID reader that has a set antenna orientation.

Therefore, there is a need in the art for improved communication between RFID tags and RFID readers.

SUMMARY

One aspect of the present invention provides a device orienting apparatus including a device-attachment structure having a non-uniform mass distribution, a post, and a base structure. The device-attachment structure includes a pivot hole and the post has a first-end section surrounded by the pivot hole. A second-end section of the post is secured so that a directional antenna is held in a preferred orientation when the post is perpendicular to a gravitational field.

Another aspect of the present invention provides a method to orient a directional antenna including affixing the directional antenna to an object in a first orientation and rotating a device-attachment structure about a post to position the directional antenna in a second orientation for communication. The rotating is due to a gravitational force on a non-uniformly distributed mass of the device-attachment structure.

Yet another aspect of the present invention provides an apparatus including means for radiating information, means for housing the means for radiating information, and means for orienting the means for radiating. The means for housing includes a non-uniformly distributed mass and the orienting is due to a gravitational force on the non-uniformly distributed mass of the housing means.

Yet another aspect of the present invention provides a device orienting apparatus including a device-attachment structure having a high-mass region, a directional antenna, and a post having a first-end section surrounded by the pivot hole. The device-attachment structure includes a pivot hole offset from the high-mass region. The directional antenna has a preferred orientation and is affixed to the device-attachment structure with the preferred orientation aligned parallel to a line connecting a center of the high-mass region to a center of the pivot hole. The post is affixable to an object having at least one preferred surface, wherein a gravitational field vector is substantially in the plane of the at least one preferred surface. The device orienting apparatus is affixed to one of the preferred surfaces of the object and the directional antenna is held in the preferred orientation when the post is perpendicular to a gravitational field.

Yet another aspect of the present invention provides a radio frequency identifier (RFID) tag orienting apparatus. The RFID tag orienting apparatus includes a tag-attachment structure having a high-mass region, an RFID tag having a preferred orientation, and a post having a first-end section surrounded by the pivot hole. The tag-attachment structure includes a pivot hole offset from the high-mass region. The RFID tag is affixed to the tag-attachment structure with the preferred orientation aligned parallel to a line connecting a center of the high-mass region to a center of the pivot hole so the preferred orientation is correlated to an orientation of a remote RFID reader. The post is affixable to an inventory item having at least one preferred surface. A gravitational field vector is substantially in the plane of the at least one preferred surface. The RFID tag orienting apparatus is affixed to one of the preferred surfaces of the inventory item and is held in the preferred orientation when the post is perpendicular to a gravitational field. The radiation emitted from the RFID tag is substantially parallel to radiation emitted from the remote RFID reader.

DRAWINGS

The various described features are not drawn to scale but are drawn to emphasize features relevant to the subject matter described. Reference characters denote like elements throughout the figures and text.

DETAILED DESCRIPTION

In the following detailed description, reference is made to the accompanying drawings that form a part hereof, and in which is shown by way of illustration specific illustrative embodiments in which the claimed invention may be practiced. These embodiments are described in sufficient detail to enable those skilled in the art to practice the claimed invention, and it is to be understood that other embodiments may be utilized and that logical, mechanical and electrical changes may be made without departing from the scope of the claimed invention. The following detailed description is, therefore, not to be taken in a limiting sense.

Figure 1A:
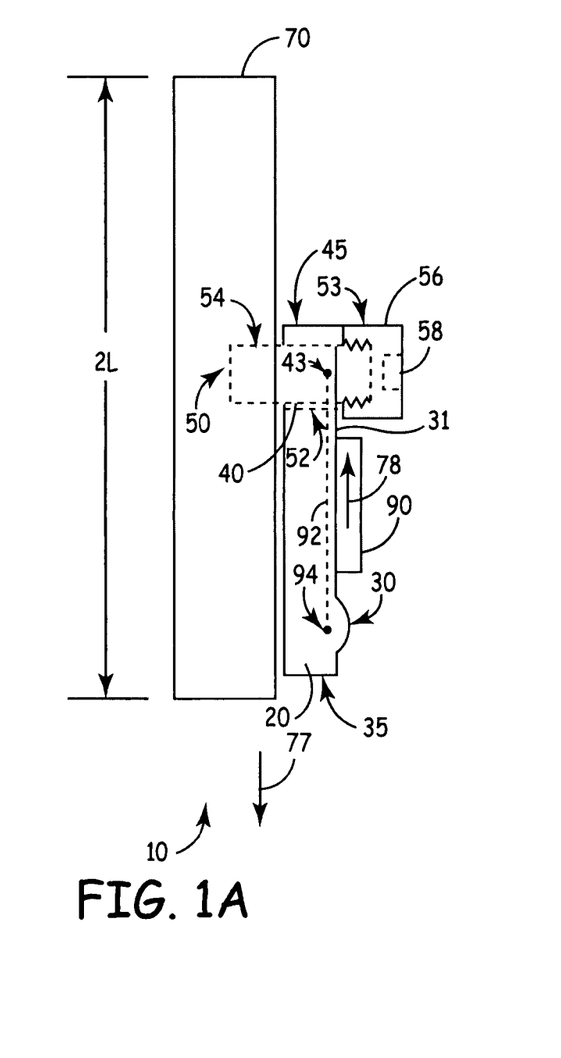
FIGS. 1A and 1B are a cross-sectional side view and a front view, respectively, of one embodiment of a device orienting apparatus.
Figure 1B:
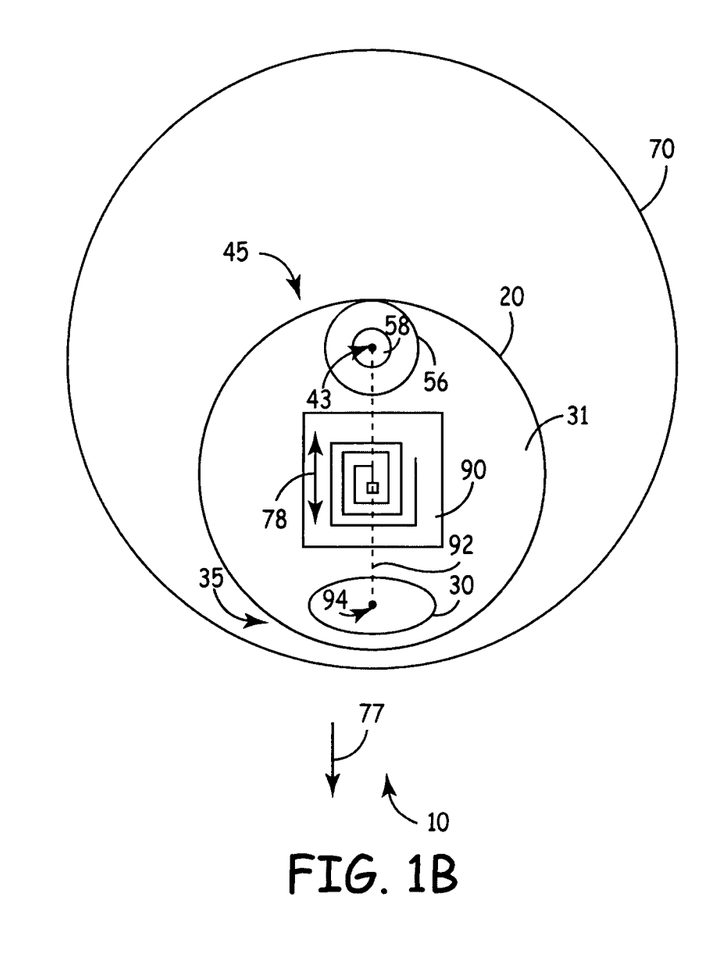

FIGS. 1A and 1B are a cross-sectional side view and a front view of one embodiment of a device orienting apparatus 10. In the embodiment shown in FIGS. 1A and 1B, the device orienting apparatus 10 includes a device-attachment structure 20 rotationally connected to a base structure 70 by a post 50. The post 50 is capped with a securing fixture 56. A directional antenna 90 is attached to the front surface 31 of the device-attachment structure 20.

Figure 2A:
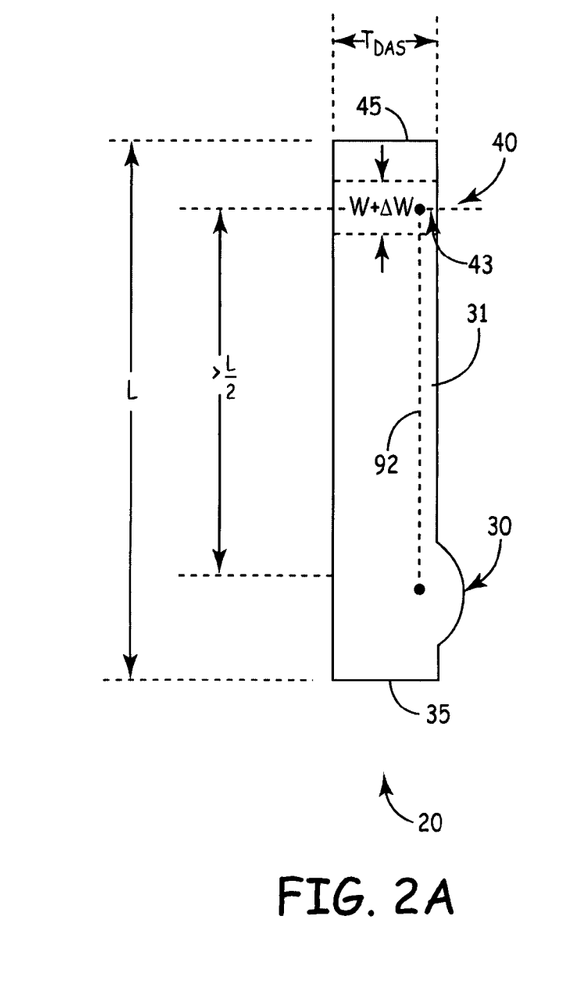
FIGS. 2A and 2B are a cross-sectional side view and a front view, respectively, of one embodiment of the device-attachment structure in the device orienting apparatus of FIGS. 1A and 1B.
Figure 2B:
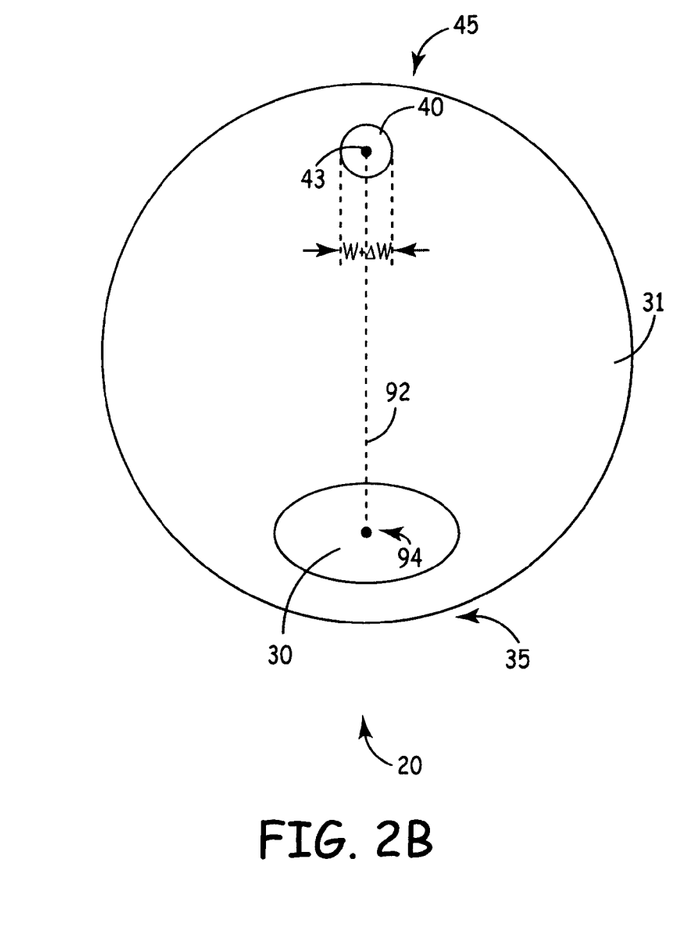

FIGS. 2A and 2B are a cross-sectional side view and a front view, respectively, of one embodiment of the device-attachment structure 20 in the device orienting apparatus 10 of FIGS. 1A and 1B. In the embodiment shown in FIGS. 2A and 2B, the device-attachment structure 20 has a non-uniform mass distribution with a high-mass region 30 located near a high-mass edge 35. The device-attachment structure 20 has a pivot hole 40 that is in the pivot region near a pivot edge 45 of the device-attachment structure 20. The pivot hole 40 has a diameter of $(W+\Delta W)$ where $\Delta W$ is much less than W. The device-attachment structure 20 has a length L from the pivot edge 45 to the high-mass edge 35. The pivot hole 40 is removed from the high-mass region by more than one half ½ of the length L. The device-attachment structure 20 has a thickness in the region near the pivot edge 45 of $T_{DAS}$.

The high-mass region 30 has a high-mass point 94 which is at or near the center of mass of the high-mass region 30. The line 92 connects the center 43 of the pivot hole 40 to the high-mass point 94. As shown in FIG. 2A, the high-mass region 30 includes a protrusion from the front surface 31 of the device-attachment structure 20. In one implementation of the embodiment of FIGS. 1A and 1B, the device-attachment structure 20 has a flat front surface 31 and the high-mass region 30 includes material that is denser than the material outside the high-mass region 30.

Figure 3A:
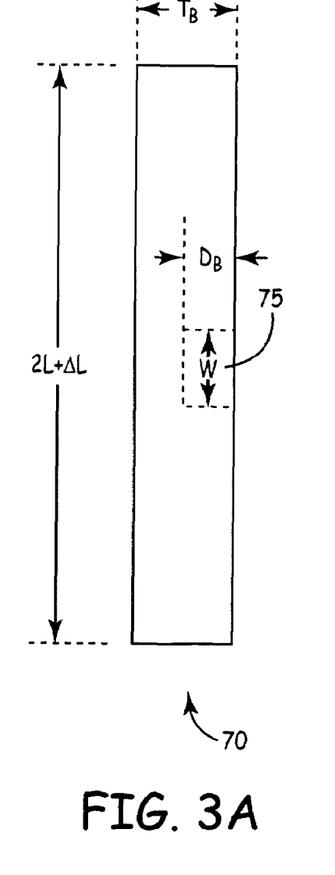
FIGS. 3A and 3B are a cross-sectional side view and a front view, respectively, of one embodiment of the base structure in the device orienting apparatus of FIGS. 1A and 1B.
Figure 3B:
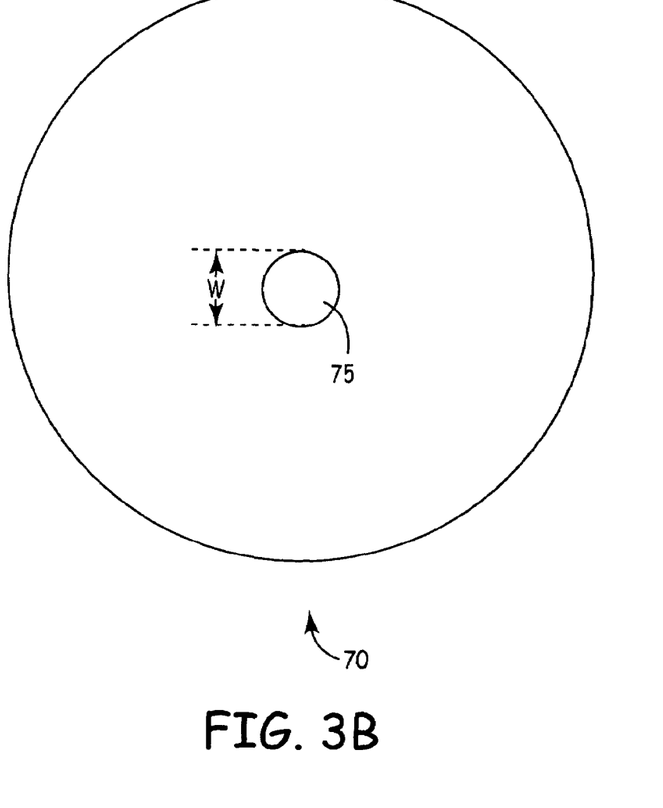

FIGS. 3A and 3B are a cross-sectional side view and a front view, respectively, of one embodiment of the base structure 70 in the device orienting apparatus 10 of FIGS. 1A and 1B. In the embodiment shown in FIGS. 1A and 1B, the base structure 70 has a diameter of $(2L+\Delta L)$, where $\Delta L$ is much less than 2L. The base structure 70 has a thickness of $T_B$. A post-securing hole 75 is approximately centered in the base structure 70. The post-securing hole 75 has a diameter of W and a depth of $D_B$.

Figure 4:
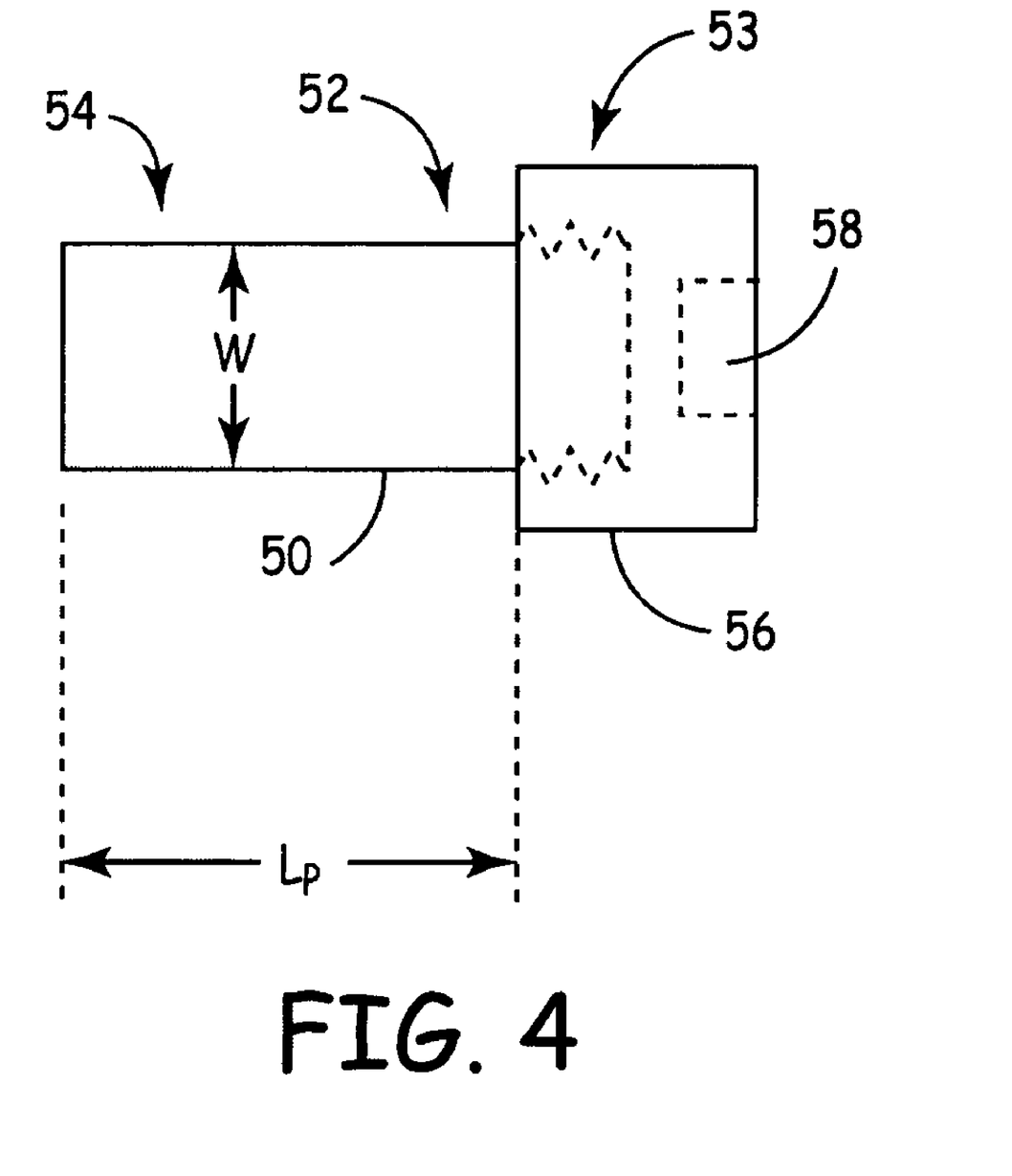
FIG. 4 is a cross-sectional side view of a post.

FIG. 4 is a cross-sectional side view of the post 50. In the embodiment shown in FIG. 3, the post 50 has a width W. The post has a first-end section 52, adjacent to a threaded-end section 53. The post 50 has a second-end section 54 at the end opposing the first-end section and the threaded-end section 53. The length of the post 50 excluding the threaded-end section 53 is $L_P$. The length $L_P$ is greater than the sum of the thickness $T_{DAS}$ of the device-attachment structure 20, the thickness $T_B$ of the base structure 70 and the depth $D_B$ of the base structure 70. The threaded-end section 53 is threaded and matches with the threads of the securing fixture 56. The securing fixture 56 has a recessed region 58 for a screwdriver to tighten the securing fixture 56 to the post 50.

As shown in the embodiment of FIGS. 1A and 1B, second-end section 54 of the post 50 is inserted into the post-securing hole 75 of the base structure 70. Since the diameter of the post 50 is equal to the width of the post-securing hole 75, the snug fit securely attaches the post 50 to the base structure 70. The post 50 is inserted in the pivot hole 40 in the device-attachment structure 20 so the pivot hole 40 surrounds the first-end section 52 of the post 50. The securing fixture 56 is attached to the threaded-end section 53 of the post 50 to prevent the device-attachment structure 20 from slipping off the post 50. In this configuration, the device-attachment structure 20 is rotatably attached to the base structure 70 by the post 50.

Although a the snug fit attachment of the post 50 to the base structure 70 is shown here in connection with FIGS. 1A, 1B, 3A, 3B and 4, it is to be understood that other types of attachment can be used to securely attach the post 50 to the base structure 70.

Although a threaded securing fixture 56 is shown here in connection with FIGS. 1A, 1B and 4, it is to be understood that other types of securing fixtures can be used to prevent the device orienting apparatus 20 from sliding of the post 50.

Although the device-attachment structure 20 and the base structure 70 have a circular shape, as is shown here in connection with FIGS. 1A, 1B and 4, it is to be understood that the device-attachment structure 20 and the base structure 70 can have other shapes including rectangular shapes and elliptical shapes.

Figure 5A:
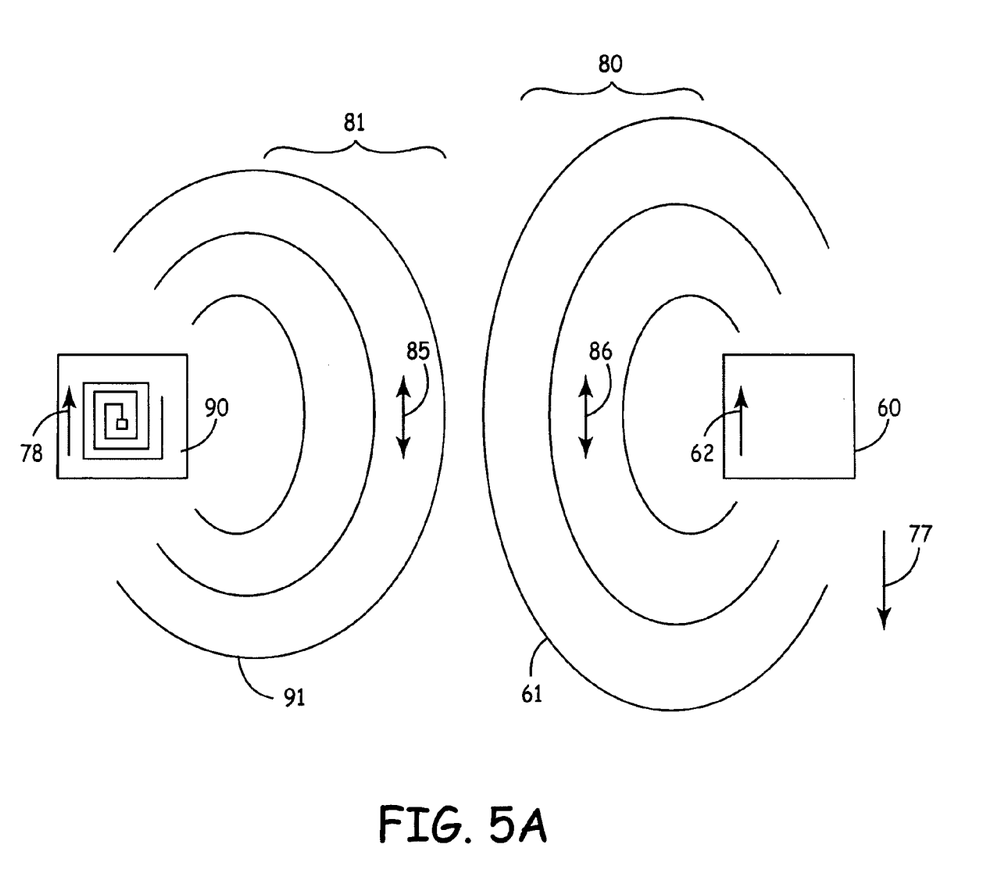
FIG. 5A illustrates communication between the directional antenna and a remote antenna in which the antennae are in a parallel orientation with respect to each other.

FIG. 5A illustrates communication between the directional antenna 90 and a remote antenna 60 in which the antennae are in a parallel orientation with respect to each other. The directional antenna 90 is effectively a dipole that is parallel to vector 78. The terms vector 78 and preferred orientation 78 are used interchangeably within this document to describe the preferred orientation for a directional antenna 90 with respect to another directional antenna 60. In the far field 81, the directional antenna 90 emits electromagnetic radiation 91 with a polarity parallel to the vector 85 within a range of frequencies. The directional antenna 90 receives electromagnetic radiation 61 with a polarity parallel to the vector 86 within a range of frequencies.

The remote antenna 60 is effectively a dipole that is parallel to vector 62. In the far field 80, the directional antenna 60 emits electromagnetic radiation 61 with a polarity parallel to the vector 86 within a range of frequencies. The directional antenna 60 receives electromagnetic radiation 91 with a polarity parallel to the vector 85 within a range of frequencies. As shown in FIG. 5A, the directional antenna 90 communicates with one or more remote antennae 60 since the remote antenna 60 and the directional antenna 90 emit and receive radiation of the parallel polarity.

In FIG. 5A, only one such remote antenna 60 is shown though it is to be understood that one or more remote antennae 60 are used in various implementations of such an embodiment. In an implementation of an embodiment of the directional antenna 90 and the remote antenna 60, the directional antenna 90 is an RFID tag and the remote antenna 60 is an RFID reader. In such an implementation, the preferred orientation is correlated to an orientation of a remote RFID reader. As used herein, the phrases "directional antenna" and "RFID tag" are used interchangeably. As used herein, the phrases "remote antenna" and "RFID reader" are used interchangeably. Additionally as used herein, the phrases "object" and "inventory item" are used interchangeably and the phrase "device attachment structure" and "tag-attachment structure" are used interchangeably.

Figure 5B:
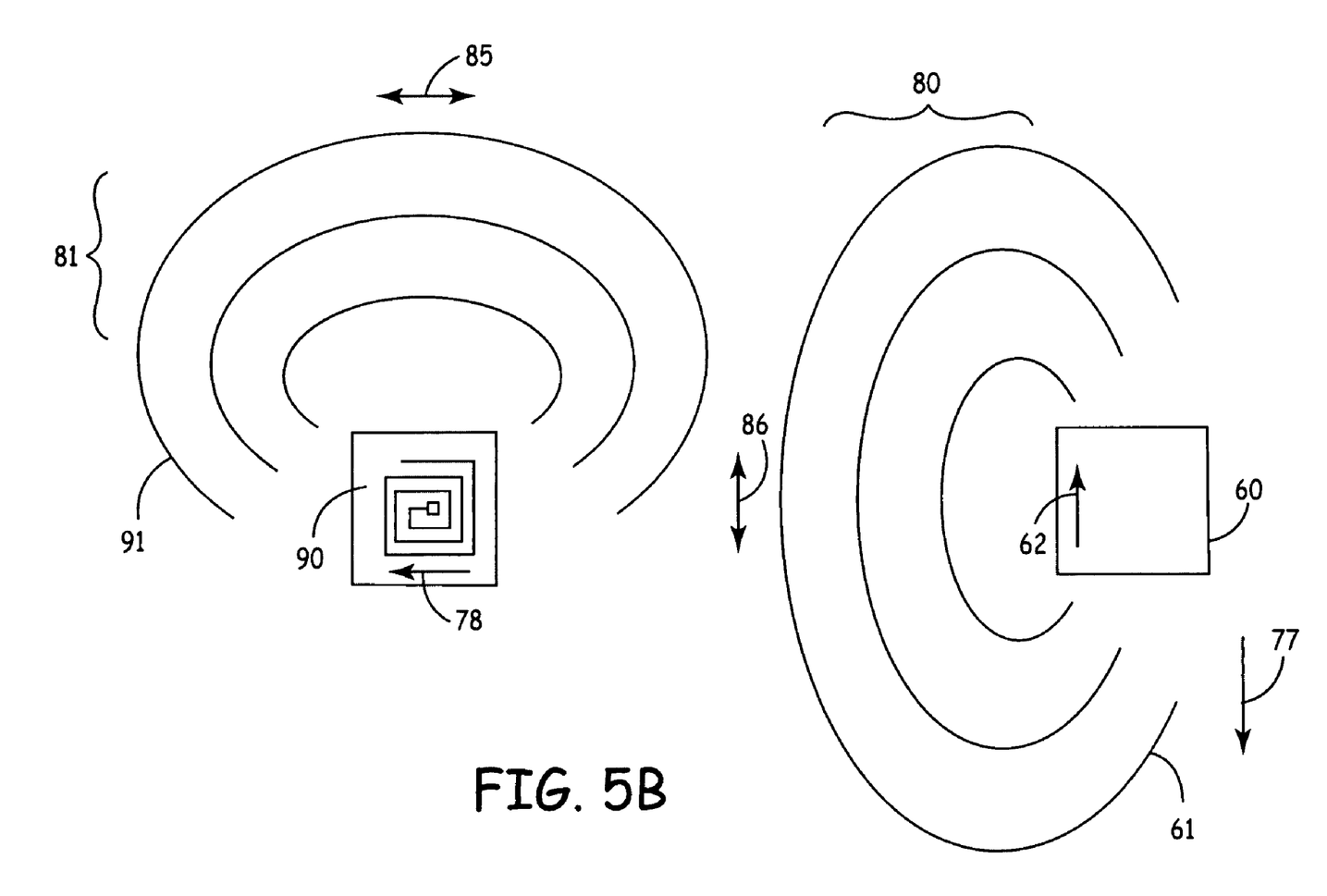
FIG. 5B illustrates failed communication between the directional antenna and a remote antenna in which the antennae are in an orthogonal orientation with respect to each other.

FIG. 5B illustrates failed communication between the directional antenna 90 and a remote antenna 60 in which the antennae are in an orthogonal orientation with respect to each other. In this configuration, the electromagnetic radiation 91 emitted from the directional antenna 90 has a polarity perpendicular to the polarity of the electromagnetic radiation 61 emitted from the remote antenna 60. Since the directional antenna 90 and the remote antenna 60 emit and receive radiation having orthogonally-oriented polarizations directional antenna 90 and the remote antenna 60 do not effectively communicate with each other. If the polarity parallel to the vector 78 is at an angle θ with respect to the polarity parallel to the vector 62, the signal strength communicated between the directional antenna 90 and the remote antenna 60 is a function of the cos θ, as is known in the art.

As shown in FIGS. 1A and 1B, the directional antenna 90 is affixed to the device-attachment structure 20 and is held in a preferred orientation, in which the polarity of the emitted radiation is parallel to vector 78. When the post 50 is perpendicular to the gravitational field vector 77 the directional antenna 90 affixed to the device-attachment structure 20 as shown, is held in the preferred orientation 78 and is operable to communicate with a remote antenna 60 as shown in FIG. 5A. In an implementation of an embodiment of the device orienting apparatus 10, the directional antenna 90 is an RFID tag in a system with a remote antenna 60 that is an RFID reader. In such a system, all the RFID readers in the system have as a standard orientation. In one such implementation the standard system orientation is the orientation shown for the remote antenna 60 in FIG. 5A.

As shown in FIGS. 1A and 1B, the directional antenna 90 has a preferred orientation 78 that is parallel to the line 92 connecting the high-mass point 94 of the high-mass region 30 to the center 43 of the pivot hole 40. In such an implementation, the directional antenna 90 has a vertically-preferred orientation as described above with reference to FIGS. 5A and 5B.

The directional antenna 90 is affixed to the device-attachment structure 20 with the preferred orientation 78 aligned parallel to the line connecting the high-mass point 94 of the high-mass region 30 to the pivot hole 40. In this manner, the directional antenna 90 is held in the preferred orientation 78 when the post 50 is perpendicular to the gravitational field vector 77 or vector 77. The gravitational field rotates the device-attachment structure 20 about the post 50 until the high-mass region is closest to the earth.

The base structure 70 has a dimension greater than about twice a longest dimension of the device-attachment structure 20. In this manner, when the device-attachment structure 20 rotates 360° about the post 50, the device-attachment structure 20 does not extend beyond the base structure 70. This ensures that the device-attachment structure 20 is not impeded in its rotation about the post 50 by other structures on the same surface as the base structure 70.

Although the base structure 70 has a diameter 2L greater than about twice a longest dimension L of the device-attachment structure 20 as shown here in connection with FIGS. 1A, 1B, 2A, 2B, 3A, and 3B, it is to be understood that in some implementations of the embodiment, the base structure 70 has a diameter less than about twice a longest dimension L of the device-attachment structure 20. In some implementations of the embodiment, the diameter of the base structure 70 is the same as the diameter W of the post 50. In this case, the base structure 70 does not have a hole in it. Then the post 50 is indistinguishable from the base structure 70 and is referred to as base structure/post. The base structure/post is then attached to the item in an inventory.

Although the directional antenna 90 is shown here in connection with FIGS. 1A, 1B with a vertically aligned preferred orientation, it is to be understood that other the preferred orientation 78 can be any angle from 0° to 90° with respect to vector 78. The preferred orientation 78 will be parallel to the orientation of the communicating directional antenna, such as remote antenna 60 in FIG. 5A.

Figure 6:
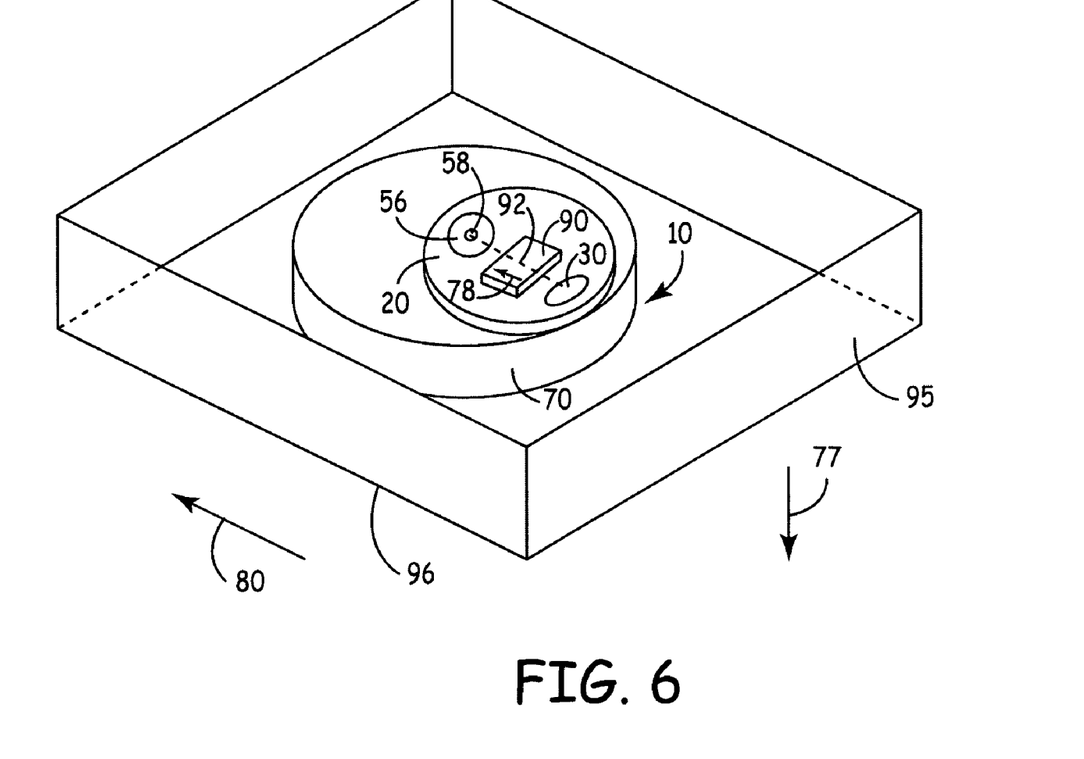
FIG. 6 illustrates a directional antenna affixed to a device orienting apparatus in a first orientation according to an embodiment of the device orienting apparatus of FIGS. 1A and 1B.

FIG. 6 illustrates the directional antenna 90 affixed to a device orienting apparatus 10 in an orientation within a housing 95. The vector 80 is parallel to a long edge 96 of the housing 95. In this illustrated implementation of the embodiment of the device orienting apparatus 10, the housing 95 is perpendicular to the gravitational field vector 77 and the device orienting apparatus 10 is affixed in the housing 95 with the preferred orientation 78 parallel to vector 80. The vector 80 is defined herein as a first orientation.

In other implementations of the embodiment of the device orienting apparatus 10, the device orienting apparatus 10 is affixed in the housing 95 with the preferred orientation 78 at any angle with respect to vector 80. In one implementations of the embodiment of the device orienting apparatus 10, the base structure 70 has an adhesive material on the back surface to attach the device orienting apparatus 10 to the housing 95.

Figure 7:
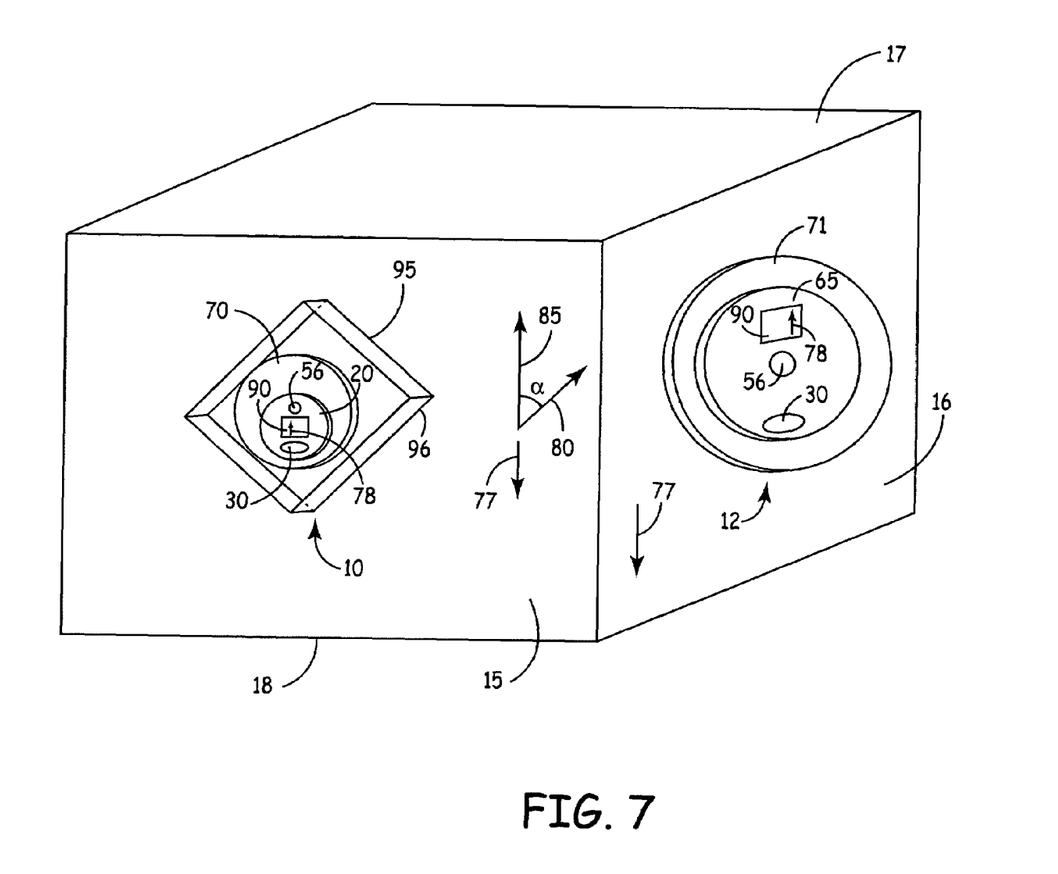
FIG. 7 illustrates embodiments of the directional antennae affixed to an object in a second orientation for communication with the remote directional antenna.

FIG. 7 illustrates embodiments of the directional antenna 90 affixed to an object 18 in a second orientation for communication with the remote directional antenna 60 (not shown in FIG. 7). The object 18 includes two side surfaces 15 and 16, and a top surface 17. There are other side surfaces that are not visible in FIG. 7. The gravitational field vector 77 is in the plane of the two side surfaces 15 and 16. Any surface of object 18 in which the gravitational field vector 77 lies or substantially lies is a preferred surface. Thus, the side surfaces 15 and 16 of object 18 are two preferred surfaces of the object 18. The device orienting apparatus 10 affixed to the housing 96 of FIG. 6 is affixed to the preferred surface 15 of object 18. The housing 95 is oriented so that the edge 96 parallel to the vector 80 is not parallel to the edge where preferred surface 15 intersects with preferred surface 16. The force of gravity has caused a rotation of the device-attachment structure 20 about the post 50 (FIGS. 1A and 1B) to position the dispersive antenna 90 in a second orientation for communication with a remote directional antenna aligned as shown for remote directional antenna 60 of FIG. 5A.

The second orientation is in the direction in which vector 85 points. Vector 85 is parallel to vector 78 after the housing 95 is attached to the preferred surface 15. The first orientation parallel to vector 80 in FIG. 6 is shown to subtend an angle α with respect to the second orientation parallel to vector 85.

Another implementation of an embodiment of a device orienting apparatus 12 is illustrated affixed to the preferred surface 16. The device orienting apparatus 12 is described in detail below with reference to FIG. 9A, 9B, 10A and 10B. The directional antenna 90 attached to the device orienting apparatus 12 is aligned by the gravitational field vector 77 so that the preferred orientation 78 of directional antenna 90 is parallel to the gravitational field vector 77. The device orienting apparatus 12 is not in a housing 95. In this implementation, the base structure 70 is affixed directly to the preferred surface 16. In implementations of the embodiment that include a base structure/post as defined above with reference to FIGS. 1A-4, the base structure/post is stuck like a pin into the item in inventory. In another implementation of this embodiment, the item in inventory has a hole that mates with the base structure/post and the base structure/post is stuck into that hole.

If the object 18 to which the device orienting apparatus 10 and device orienting apparatus 12 are affixed is turned up-side down, the device-attachment structure 20 and device-attachment structure 60 of device orienting apparatus 12 will rotate about the post 50 and remain aligned to the preferred orientation 78.

Figure 8:
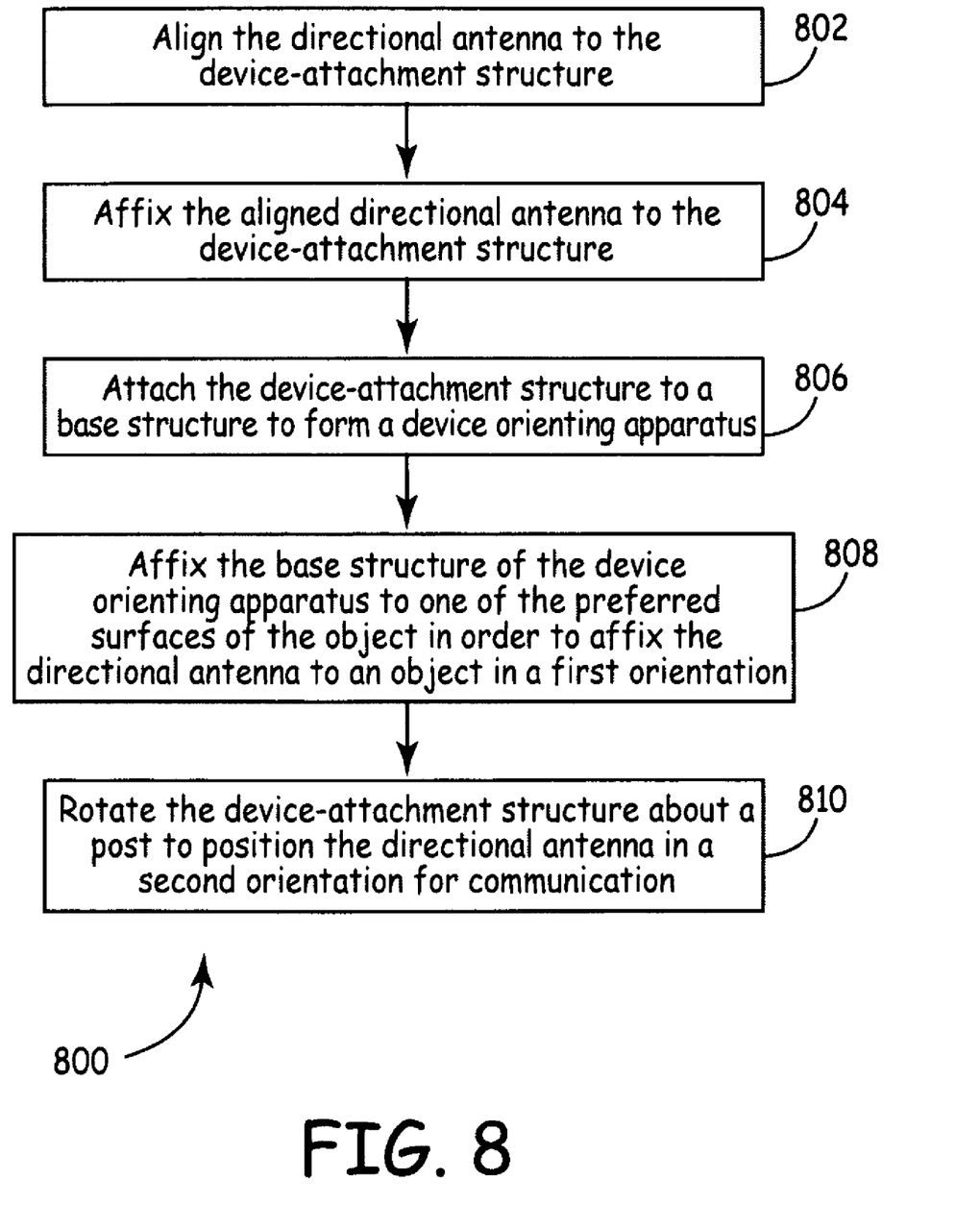
FIG. 8 is one embodiment of a method to orient a directional antenna.

FIG. 8 is a method 800 to orient a directional antenna 90. The embodiment of method 800 is described as being implemented using the directional antenna 90 and the device orienting apparatus 10 of FIGS. 1A and 1B.

The directional antenna 90 is aligned to the device-attachment structure 20 by aligning the preferred orientation 78 of the directional antenna 90 parallel to the line 92 that connects the center 43 of the pivot hole 40 to the high-mass point 94 of the high-mass region 30 of the device-attachment structure 20 (block 802). In some implementations of the embodiment of FIGS. 1A and 1B, the preferred orientation 78 is recognizable from a visual inspection of the circuits that form the directional antenna 90. In other implementations of the embodiment of FIGS. 1A and 1B, the preferred orientation 78 is recognizable from an alignment marked formed on the directional antenna 90 during processing of the circuitry of the directional antenna 90. In some implementations of the embodiment of FIGS. 1A and 1B, an alignment marker parallel to line 92 is recognizable from a visual inspection of the device-attachment structure 20. In other implementations of the embodiment of FIGS. 1A and 1B, a line 92 is formed in the device-attachment structure 20. The directional antenna 90 can be located at any position on the front surface 31 of the device-attachment structure 20, since the alignment, but not the location, of the device-attachment structure 20 is important to the functioning of the device orienting apparatus 10.

The directional antenna 90 is affixed to the device-attachment structure 20 while in the aligned position (block 804). The directional antenna 90 is affixed by known technologies for attaching electronic circuits on carrier boards, housing packages and the like. The directional antenna 90 is a circuit on a carrier such as a chip or a circuit board. In one implementation of the device orienting apparatus 10, epoxy is applied to the back surface of a carrier of the directional antenna 90 and the carrier is place in the aligned direction on a face of the device-attachment structure 20. In another implementation of the device orienting apparatus 10, a carrier board of the directional antenna 90 is snapped into the device-attachment structure 20. In yet another implementation of the device orienting apparatus 10, an encapsulate is applied over the top and edges of the aligned directional antenna 90 and cured to affix the directional antenna 90 to the device-attachment structure 20.

The device-attachment structure 20 is then attached to the base structure 70 to form a device orienting apparatus 10 (block 806). The second-end section 54 of post 50 is attached to the base structure 70 and the pivot whole 40 placed around the first-end section 52 of the post 50. A securing fixture 50, such as a nut, is attached to the threaded-end section 53 of the post 50.

In one implementation of the embodiment of the base structure 70, base structure 70 and the post 50 are plastic molded as one piece. In this case, a post structure protrudes from a relatively flat surface of the plastic molded piece and the device-attachment structure 20 is slipped over the protrusion. In another implantation of the device orienting apparatus 10, the device-attachment structure 20, the base structure 70, the post 50 and the securing fixture 56 are plastic and are formed by stereo lithographic molding technologies wherein the device-attachment structure 20 is able to rotate 360° about a post 50 between the base structure 70 and the securing fixture 56.

The base structure 70 of the device orienting apparatus 20 is affixed to the one of the preferred surfaces of an object 18, such as preferred surface 15 of the object 18 illustrated in FIG. 7 (block 808). In one implementation of the embodiment, the base structure 70 has an adhesive material on the back surface and the base structure 70 is directly attached to the object 18. In another implementation of the embodiment, the base structure 70 is attached to the housing 95 and the housing 95 has an adhesive material on the back surface and is attached to the object 18.

In another implementation of the embodiment, when the base structure 70 is affixed to the object 18, the object 18 is positioned so that the preferred surface 15 to which the base structure 70 is affixed is orthogonal to the gravitational field 70. In this case, the directional antenna 90 is affixed to the object 18 while in a first orientation 80, as described above with reference to FIG. 7. In this implementation of the embodiment, the first orientation can be any one of 360° in the plane perpendicular to the gravitational field vector 77.

When the object 18 is rotated so the preferred surface 15 of the object 18 is aligned for storage or shipping, the gravitational field vector 77 is aligned in the plane of the preferred surface 15. The device-attachment structure 20 rotates about the post 50 as the object 18 is rotated so that the directional antenna 90 is in a second orientation 85 that is the preferred orientation 78 when the post 50 is perpendicular to the gravitational field (block 810).

Figure 9A:
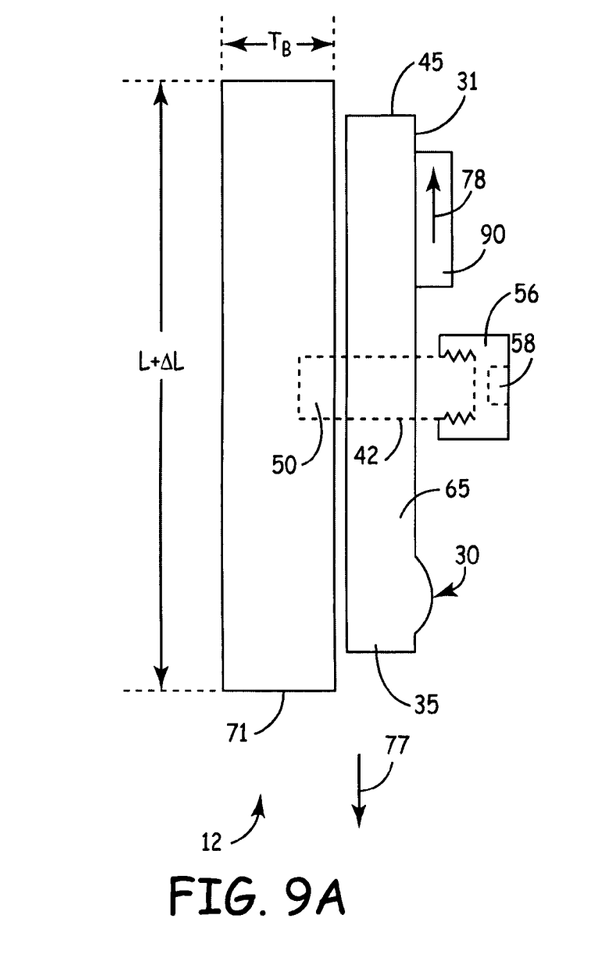
FIGS. 9A and 9B are a cross-sectional side view and a front view of a second embodiment of a device orienting apparatus.
Figure 9B:
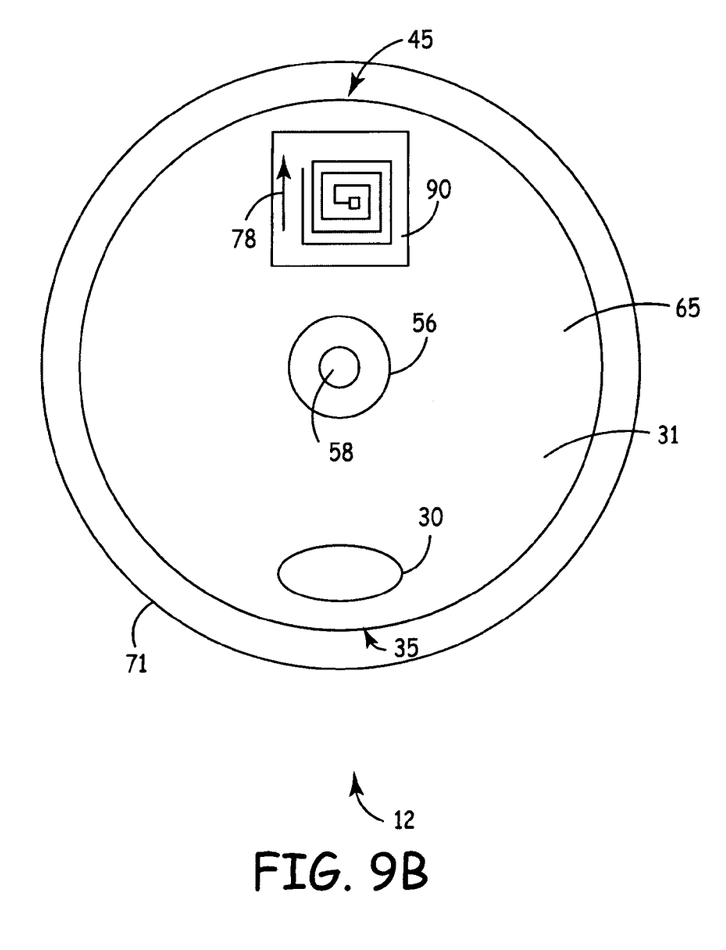

FIGS. 9A and 9B are a cross-sectional side view and a front view of a second embodiment of a device orienting apparatus 12. In the embodiment shown in FIGS. 9A and 9B, the device orienting apparatus 12 includes a device-attachment structure 65 rotationally connected to a base structure 70 by a post 50. The post 50 is capped with a securing fixture 56. A directional antenna 90 is attached to the front surface 31 of the device-attachment structure 65.

Figure 10A:
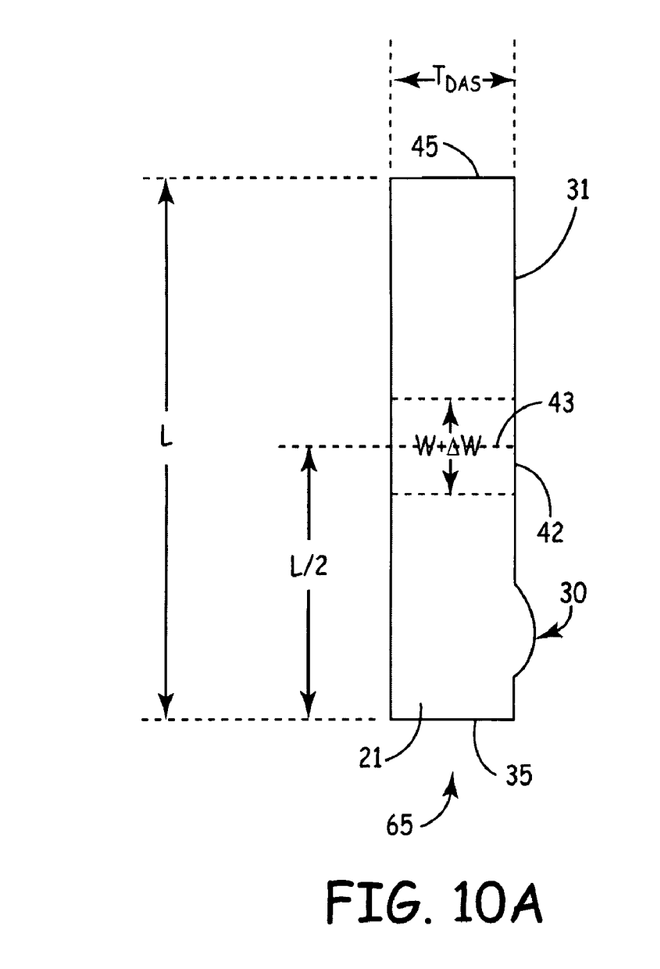
FIGS. 10A and 10B are a cross-sectional side view and a front view, respectively, of a second embodiment of the device-attachment structure in the device orienting apparatus of FIGS. 9A and 9B.
Figure 10B:
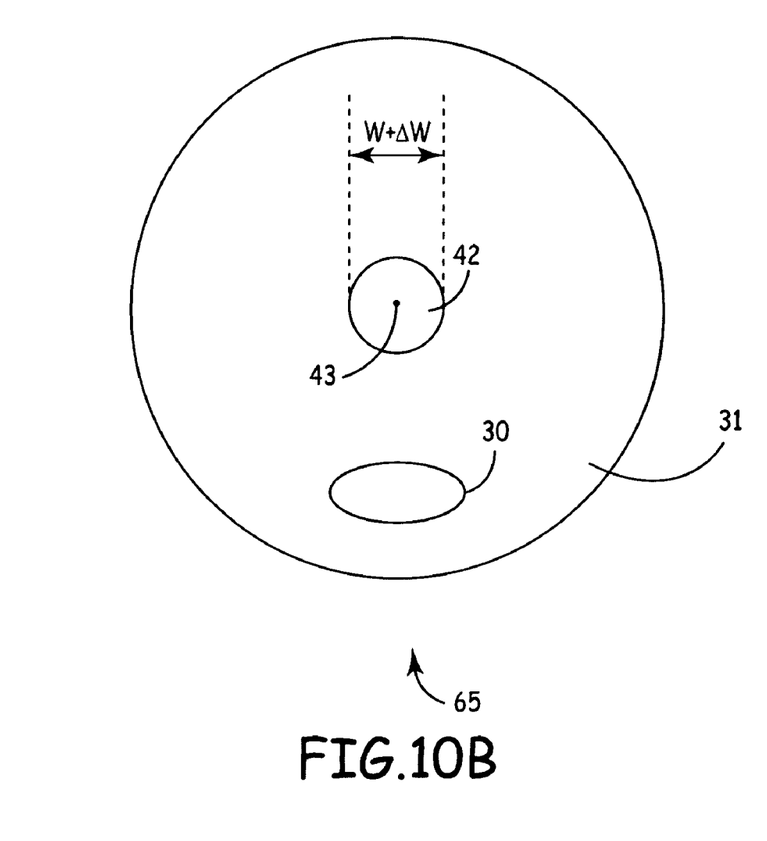

FIGS. 10A and 10B are a cross-sectional side view and a front view, respectively, of a second embodiment of the device-attachment structure 65 in the device orienting apparatus 12 of FIGS. 9A and 9B. FIGS. 9A and 9B differ from FIGS. 1A and 1B and FIGS. 10A and 10B differ from FIGS. 2A and 2B in that the pivot hole 40 is about centered in the device attachment structure 65 and the high-mass region 30 is asymmetrically off-center of the device-attachment structure 65. In some implementations of the embodiment of the device-attachment structure 65, the high-mass region 30 in included in less than half of the volume of the device-attachment structure 65.

In the implementation of the embodiment of the device-attachment structure 65 shown in FIGS. 9A, 9B, 10A and 10B, the thickness $T_{DAS}$, width W and length L of the device-attachment structure 65 is the same as the device-attachment structure 20 of FIGS. 1A, 1B, 2A and 2B. As shown in FIGS. 10A and 10B, the pivot hole 42 is centered in the device-attachment structure 65. The diameter of the device-attachment structure 65 is L and the center 43 of the pivot hole 42 is at the L/2 from the high-mass edge 35 of the directional antenna 65. In one implementation of the embodiment of FIGS. 9A and 9B, the device-attachment structure 65 is flat and the high-mass region 30 includes material that is denser than the material outside the high-mass region 30.

In the implementation of the embodiment of the base structure 71 shown in FIGS. 9A, 9B, 10A and 10B the thickness $T_{DAS}$ of the device-attachment structure 65 is the same as the device-attachment structure 20 of FIGS. 1A and 1B. The base structure 71 has a diameter of (L+ΔL). The post 50 is the same as the post 50 shown in FIGS. 1A, 1B and 4.

The functionality of the device orienting apparatus 12 is to orient the directional antenna 90 in a preferred orientation with the post 50 is perpendicular to the gravitational field. The manner in which the device orienting apparatus 12 is used is similar to the manner in which the device orienting apparatus 10 is used, as described above with reference to FIGS. 1A-8.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A device orienting apparatus comprising:
a device-attachment structure having a non-uniform mass distribution, the device-attachment structure including a pivot hole;
a post having a first-end section surrounded by the pivot hole; and
a base structure in which a second-end section of the post is secured, wherein a directional antenna is held in a preferred orientation when the post is perpendicular to a gravitational field vector.

2. The device orienting apparatus of claim 1, wherein the pivot hole is at a pivot region removed from a high-mass region of the device attachment structure by more than half of a length of the device-attachment structure.

3. The device orienting apparatus of claim 2, wherein the directional antenna is affixed to the device-attachment structure with the preferred orientation aligned parallel to a line connecting a center of the high-mass region to the pivot hole.

4. The device orienting apparatus of claim 3, wherein the base structure has a dimension greater than about twice a longest dimension of the device-attachment structure.

5. The device orienting apparatus of claim 4, further comprising:
a housing having a dimension greater than about twice a longest dimension of the device-attachment structure.

6. The device orienting apparatus of claim 5, wherein the base structure is the housing.

7. The device orienting apparatus of claim 1, wherein the pivot hole is about centered in the device attachment structure and a high-mass region is asymmetrically off-center of the device-attachment structure.

8. The device orienting apparatus of claim 7, wherein the directional antenna is affixed to the device-attachment structure with the preferred orientation aligned parallel to a line connecting a center of the high-mass region to a center of the pivot hole.

9. The device orienting apparatus of claim 1, wherein the device orienting apparatus is affixed to an object.

10. The device orienting apparatus of claim 9, wherein the object has at least one preferred surface and wherein the device orienting apparatus is affixed to one of the preferred surfaces of the object.

11. The device orienting apparatus of claim 10, wherein a gravitational field vector is in the plane of the at least one preferred surface.

12. The device orienting apparatus of claim 1, further comprising:
a housing for the device orienting apparatus.

13. The device orienting apparatus of claim 12, wherein the housing is affixed to an object.

14. The device orienting apparatus of claim 13, wherein the object has a least one preferred surface and wherein the device orienting apparatus is affixed to one of the preferred surfaces of the object.

15. The device orienting apparatus of claim 1, further comprising:
a securing fixture operably secured to a portion of the post adjacent to the first-end section of the post to prevent the device-attachment structure from sliding off the post.

16. A method to orient a directional antenna, the method comprising:
aligning the directional antenna in a preferred orientation to a device-attachment structure;
affixing the aligned directional antenna to the device-attachment structure;
rotatably affixing the device-attachment structure to a base structure to form a device orienting apparatus; and
rotating the device-attachment structure about a post to position the directional antenna in a preferred orientation for communication, wherein the rotating is due to a gravitational force on a non-uniformly distributed mass of the device-attachment structure.

17. The method of claim 16, further comprising:
affixing the device orienting apparatus to one of preferred surfaces of the object, wherein a gravitational field vector is substantially in a plane of the one of preferred surfaces, wherein the directional antenna is affixed to the object in a first orientation.

18. The method of claim 16, wherein rotatably affixing the device-attachment structure to a base structure comprises:
encircling the device-attachment structure about the post, the post connected to the base structure.

19. An apparatus comprising:
means for radiating information;
means for attaching the means for radiating information to a surface of a non-uniformly distributed mass in an aligned direction;
means for rotatably attaching the non-uniformly distributed mass to a base structure;
means for attaching the base structure to an inventory item, wherein the means for radiating is oriented due to a gravitational force on the non-uniformly distributed mass.

20. A device orienting apparatus comprising:
a device-attachment structure having a high-mass region, the device-attachment structure including a pivot hole offset from the high-mass region;
a directional antenna having a preferred orientation, the directional antenna affixed to the device-attachment structure with the preferred orientation aligned parallel to a line connecting a center of the high-mass region to a center of the pivot hole;
a post having a first-end section surrounded by the pivot hole, wherein the post is affixable to an object having at least one preferred surface, wherein a gravitational field vector is substantially in the plane of the at least one preferred surface, wherein the device orienting apparatus is affixed to one of the preferred surfaces of the object, and wherein the directional antenna is held in the preferred orientation when the post is perpendicular to a gravitational field.

21. The device orienting apparatus of claim 20, further comprising:
a base structure, wherein the post is affixable to the object when a second-end section of the post is secured in the base structure.

* * * * *

UNITED STATES PATENT AND TRADEMARK OFFICE
CERTIFICATE OF CORRECTION

PATENT NO.       : 7,589,693 B2                                    Page 1 of 1
APPLICATION NO.  : 11/331923
DATED            : September 15, 2009
INVENTOR(S)      : Clarence R. Locke It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 801 days.

Signed and Sealed this

Twenty-first Day of September, 2010

David J. Kappos
*Director of the United States Patent and Trademark Office*